United States Patent
Pazdziora et al.

(10) Patent No.: US 10,585,862 B2
(45) Date of Patent: Mar. 10, 2020

(54) EFFICIENT DATA MIGRATION WITH REVERSIBLE DATABASE SCHEMA MODIFICATION

(71) Applicant: Red Hat, Inc., Raleigh, NC (US)

(72) Inventors: Jan Pazdziora, Brno (CZ); Milan Zazrivec, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 668 days.

(21) Appl. No.: 14/193,683

(22) Filed: Feb. 28, 2014

(65) Prior Publication Data

US 2015/0248403 A1    Sep. 3, 2015

(51) Int. Cl.
*G06F 16/21* (2019.01)

(52) U.S. Cl.
CPC .......... *G06F 16/214* (2019.01); *G06F 16/211* (2019.01)

(58) Field of Classification Search
CPC .......................... G06F 17/30292; G06F 17/303
USPC ........................................................ 707/809
See application file for complete search history.

(56) References Cited

U.S. PATENT DOCUMENTS

| | | | |
|---|---|---|---|
| 5,797,137 A | 8/1998 | Golshani et al. | |
| 7,571,173 B2 | 8/2009 | Yang et al. | |
| 8,364,631 B1 | 1/2013 | Gutti et al. | |
| 2004/0064487 A1* | 4/2004 | Nguyen | G06F 16/214 707/999.204 |
| 2004/0216030 A1 | 10/2004 | Hellman et al. | |
| 2005/0149537 A1* | 7/2005 | Balin | G06F 17/303 707/100 |
| 2006/0136471 A1 | 6/2006 | Ge et al. | |
| 2006/0184561 A1* | 8/2006 | Terada | G06F 16/214 707/999.102 |
| 2006/0195436 A1* | 8/2006 | Levesque | G06F 16/214 707/999.004 |
| 2006/0235899 A1* | 10/2006 | Tucker | G06F 16/214 707/999.2 |
| 2006/0294120 A1 | 12/2006 | Li et al. | |
| 2008/0281820 A1* | 11/2008 | Do | G06F 16/214 707/999.006 |
| 2009/0125796 A1* | 5/2009 | Day | G06F 9/4443 715/219 |

(Continued)

FOREIGN PATENT DOCUMENTS

WO    WO2009/050167 A1    4/2009

OTHER PUBLICATIONS

Curino et al., "Automating Database Schema Evolution in Information System Upgrades", Oct. 25, 2009 (5 pages).

(Continued)

*Primary Examiner* — Pierre M Vital
*Assistant Examiner* — Andrew N Ho
(74) *Attorney, Agent, or Firm* — K&L Gates LLP

(57) ABSTRACT

Various example embodiments are directed to systems and methods for migrating a database from a source database having a source schema to a target database having a target schema. For example the migrating may comprise a pre-migration phase and a migration phase. The pre-migration phase may comprise either executing a pre-migration command to modify at least a portion of the source database or generating a pre-migration object at the source database. The migration phase may comprise selecting at least one column from the source database that was modified during the pre-migration phase and writing the at least one column to the target database.

20 Claims, 6 Drawing Sheets

(56) References Cited

U.S. PATENT DOCUMENTS

2009/0240726 A1* 9/2009 Carter ................ G06F 16/211
                                                       707/999.103
2013/0339943 A1    12/2013 Mallya

OTHER PUBLICATIONS

Drumm et al., "QuickMig—Automatic Schema Matching for Data Migration Projects", Nov. 6-8, 2007 (10 pages).
McBrien et al., "Automatic migration and wrapping of database applications—a schema transformation approach" (23 pages).
McBrien et al., "Schema evolution in Heterogeneous Database Architectures, A Schema Transformation Approach" (16 pages).
Tong, "Database Schema Transformation Optimisation Techniques for the AutoMed System" (15 pages).

* cited by examiner

EFFICIENT DATA MIGRATION WITH REVERSIBLE DATABASE SCHEMA MODIFICATION

BACKGROUND

Databases play an increasingly important role in modern life and business. Businesses have come to use databases in any number of different contexts. Human resource departments use databases to store data describing employees, including, compensation information, address information, etc. Sales and marketing departments use customer relationship management (CRM) databases to store data describing customers including, for example, purchases, product preferences, etc. Information technology (IT) departments use databases for many purposes including, for example, to store data describing computer devices, software applications, etc. Consumers too are becoming increasingly dependent on databases. For example, a typical computer device user may use a media application that maintains a database of available media files, a calendar or e-mail application that maintains a database of personal and/or business contacts, a financial application that maintains a database of financial records, and others.

A database schema is a description of the organization of in the database. Many schemas define sets of related database objects including, tables, indices, etc. From time-to-time, it is desirable to migrate the data stored at a database to another database organized according to a different schema. For example, database migrations are often performed when upgrading to a different type or version of a database, when merging redundant databases or systems, etc. Database migrations between databases with different schemas often require considerable time and effort from human programmers and can consume considerable computing resources.

SUMMARY

Various examples are directed to systems and methods for migrating a database from a source database having a source schema to a target database having a target schema. The source schema may define a plurality of source schema tables. Migration instructions may be executed for each of the plurality of tables that is associated with a corresponding migration instruction. For a first source schema table, executing the migration instruction may comprise selecting at least one column of the first source schema table and writing the at least one column of the first source schema table to a first target schema table. For a second source schema table, executing the migration instruction comprises skipping the second source schema table. In some examples, migrating the database may also comprise executing a pre-migration phase, where executing the pre-migration phase comprises either executing a pre-migration command to modify the source database or generating a pre-migration object.

FIGURES

Various example embodiments are described herein in conjunction with the following figures, wherein.

DESCRIPTION

Figure 1:
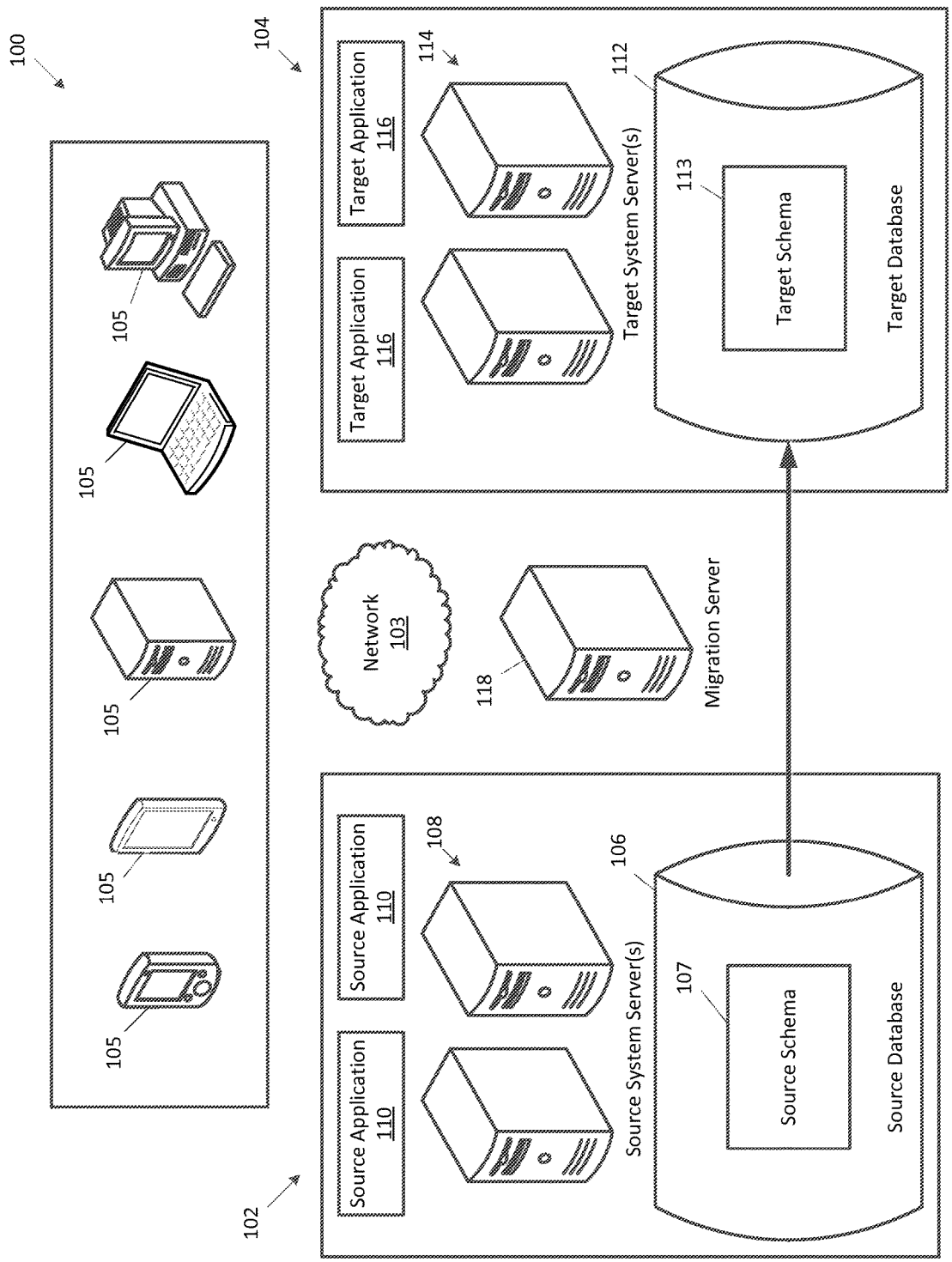
FIG. 1 is a diagram showing one example of an environment for migrating database schemas.

Various example embodiments are directed to systems and methods for migrating data from a source schema to a target schema. For example, a computer system may utilize data definition language commands to retrieve elements from the first source schema and place the elements at desired positions in the target schema. In some examples, a database select is used. For example, the computer system may select a column from one or more tables of a source database organized according to the source schema. Data returned by the database select may be written to an appropriate location at the target database according to the target schema. The set of database selects that are executed may define a mapping between the source schema and the target schema such that the data and data relationships of the source database are maintained after migration to the target database.

In some examples, the computer system may execute a pre-migration phase at the source database before migration occurs. During the pre-migration phase, the computer system may modify the source database in a manner that facilitates migration. In some examples, the computer system may use commands during the pre-migration phase that are not available during the migration phase itself. Actions taken during the pre-migration phase may condition the source database and streamline the migration process. For example, during the pre-migration phase, the computer system may create one or more pre-migration database objects and/or execute one or more pre-migration commands at the source database.

Pre-migration objects may include, for example, pre-migration tables, indices, sequences, columns, etc. A pre-migration table may be created in the source database and populated with data from one or more source schema tables. The pre-migration table may be arranged in a manner that is consistent with a corresponding table of the target schema. In some examples, the pre-migration table may be arranged in a manner that is identical to an identically named table in the target schema. During migration, the computer system may transfer the pre-migration table to the target database, while the one or more source schema tables are skipped (e.g., not transferred to the target database). In this way, data from the source schema tables is transferred to target database in a form that is consistent with the target schema. In some examples, a pre-migration table may be populated with data selected to streamline execution of the migration. For example, select operations that require complex processing may be performed during the pre-migration phase. Data may be selected from one or more source schema tables and written to a pre-migration table. Select operations executed during migration, then, may be directed to the pre-migration table rather than to the one or more source schema tables. This may reduce the computing resources consumed during the migration. Additional pre-migration objects that may be created including indices, sequences, etc. For example, a pre-migration index and/or sequence may be generated during the pre-migration phase and used during migration to streamline the execution of select and/or write commands during migration.

Pre-migration commands may be executed during the pre-migration phase to modify the source database prior to migration. Pre-migration commands may include, for example, select, insert, delete, or any other command available in the data definition language used by the source schema. For example, a target schema table may be similar to a corresponding source schema table, but may have an additional column. During the pre-migration phase, the computer system may insert a corresponding column into the source schema table so that it matches the target schema table. Accordingly, during migration, the source schema table may be directly copied to the target database.

When the pre-migration phase is complete, the computer system may execute the database migration, for example, utilizing database selects as described herein. Optionally, upon completion of the migration, the computer system may execute a post-migration phase. During the post-migration phase, changes to the source database made during the pre-migration phase may be reversed. For example, pre-migration tables and other pre-migration objects may be deleted. Any modifications to the pre-migration database made by pre-migration commands may also be reversed. Upon completion of the post-migration phase, for example, the source database may be returned to its original state, for example, a state complying with the source schema. Returning the source database to its original state may provide several advantages. For example, it may allow multiple test-runs of the migration to be conducted. Each test-run may begin with the source database in the same state (e.g., organized according to the source schema). Maintaining the source database according to the source schema may also allow the source database to remain in use, for example, by legacy applications, without introducing the potential for additional bugs or processing problems. Also, returning the source database to its pre-migration state may make it easier for the source database to be upgraded later to a different schema version. These and other advantages will be apparent from the instant description.

Reference will now be made in detail to several example embodiments, examples of which are illustrated in the accompanying figures. Wherever practical, similar or like reference numbers may be used in the figures and may indicate similar or like functionality. The figures depict examples of the disclosed systems (or methods) for purposes of illustration only. One skilled in the art will readily recognize from the following description that alternative examples of the structures and methods illustrated herein may be employed without departing from the principles described herein.

FIG. 1 is a diagram showing one example of an example environment 100 for migrating database schemas. The environment 100 comprises a source database 106 organized according to a source schema 107 and a target database 112 organized according to a target schema 113. The databases 106, 112 may be any suitable type of database organized according to any suitable schemas 107, 113. In some examples, the databases 106, 112 are relational databases organized according to a relational schema. The source and target schemas 107, 113 may define a series of tables, as well as other schema objects such as, indices, links, triggers, various commands, etc. The schema objects describe the way that data is stored according to the schema. Because the schemas 107, 113 are different, however, not all of the schema objects of the source schema 107 are translatable to the schema 113. For example, there may not be a one-to-one correlation between every table (or other object) in the source schema 106 and a corresponding table in the target schema 113.

The databases 106, 112 may be associated with respective database management systems (DBMS's). A DBMS is a software application that facilitates interaction between the respective databases 106, 112 and other components of the environment 100. For example, a DBMS may have an associated data definition language describing commands that may be executed to interact with the database. Examples of suitable DBMS's include MySQL, MariaDB, PostgreSQL, SQLite, Microsoft SQL Server available from the MICROSOFT CORPORATION, various DBMS's available from ORACLE CORPORATION, various DBMS's available from SAP AG, IBM DB2, available from THE INTERNATIONAL BUSINESS MACHINES CORPORATION, etc.

The databases 106, 112 are shown in the context of the example environment 100, which illustrates one potential configuration in which a database migration may occur. In addition to the databases 106, 112, the environment 100 comprises a source system 102, a target system 104, user devices 105, and a migration server 118. The source system 102 comprises components associated with the source database 106 including, for example, one or more source servers 108 for administering the database 106. For example, source servers 108 may execute the DBMS for the database 106. The source system 102 may also be associated with one or more source applications 110. Source applications 110 are configured to interact with the source database 106. For example, source applications 110 may be configured read and/or write to the source database 106 in a manner that is consistent with the source schema 107. The source applications 110 may be executed by any suitable system or device. For example, source applications 110 may be executed by the source system servers 108, a user device 105, etc. The target system 104 comprises components associated with the target database 112 including, for example, one or more target system servers 114 for administering the database 112. The target system servers 114, for example, may execute a DBMS for the target database 112. Target applications 116 are configured to interact with the target database 112. For example, the target applications may be configured to interact with data stored according to the target schema 113.

The user devices 105 may include any suitable devices that interact with the databases 106, 112. Examples of user devices 105 may include desktop computers, laptop computers, servers, tablet computers, cellular or other mobile phones, or any suitable device capable of interacting with the systems 102, 104. In some examples, the environment 100 also comprises a migration server 118. The migration server 118 may perform various tasks related to database migration from the source database 106 to the target database 112. The various components of the environment 100 may be in communication with one another via a network 103. The network 103 may be any suitable type of wired, wireless, or mixed network and may comprise, for example, the Internet, a local area network (LAN), a wide area network (WAN), etc.

It will be appreciated that FIG. 1 illustrates but one example environment describing one example way that the databases 106, 112 may be arranged for a database migration. For example, although FIG. 1 shows the source database 106 and target database 112 as components of separate systems 102, 104, it will be appreciated that the schema migration systems and methods described herein may be executed to migrate data between databases having any suitable hardware relationship to one another. In some examples, both the source database 106 and the target database 112 may be part of a common system with DBMS's for both databases 106, 112 executed by a common server or set of servers. In some examples, the source database 106 and target database 112 may be stored, in whole or in part, on common physical storage devices.

During database migration, data stored at the source database 106 according to the source schema 107 is transferred to the target database 112. Often, migration involves modifications to the data structure to comply with the target schema 113. Migration, as described herein, involves actions that may executed on the source database 106 as well as on the target database 112. These actions are described herein as being executed by the migration server 118. It will be appreciated, however, that any of the actions described herein may be executed by any system having access to the respective databases 106, 112. For example, various aspects of the described database migration may be performed by the source system servers 108 and/or the target system servers 114.

Figure 2:
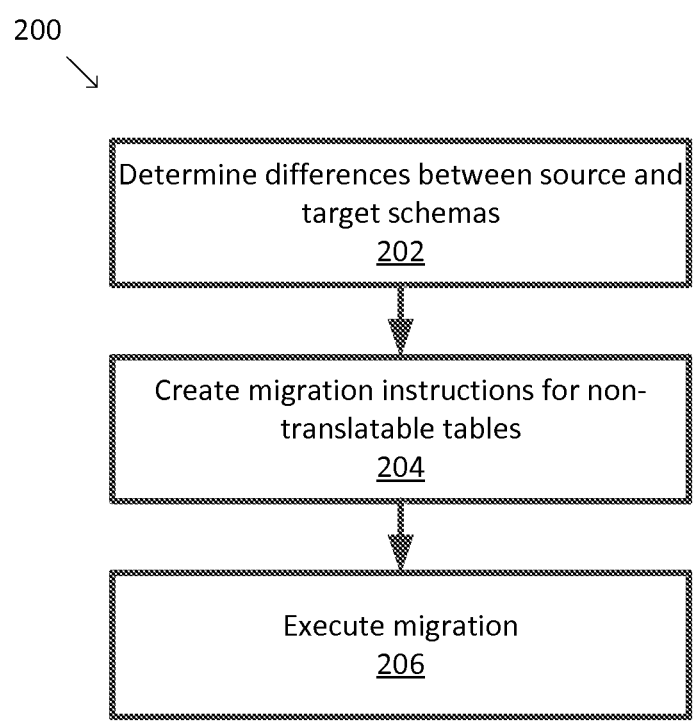
FIG. 2 is a flow chart showing one example of a process flow for migrating data from the source database to the target database.

FIG. 2 is a flow chart showing one example of a process flow 200 for migrating data from the source database 106 to the target database 112. Although the process 200 is described with reference to the flowchart illustrated in FIG. 2, it will be appreciated that many other methods of performing the acts associated with the process 200 may be used. For example, the order of some of the acts may be changed, certain actions may be combined with other actions, and some of the actions described are optional. At 202, the migration server 118 may determine differences between the source and target schemas. This may involve determining tables from the source schema 107 that are not translatable to the target schema 113. For example, a portion of the tables of the source schema 107 may have a one-to-one correlation to corresponding tables of the target schema 113. These translatable tables may later be copied from the source database 106 to the target database 112 without further modification. Non-translatable source schema tables that lack a one-to-one corresponding table in the target schema 113, however, may require additional processing, as described herein.

At 204, migration instructions may be created for each non-translatable source schema table. The migration instructions may be generated in an automated manner (e.g., by the migration server 118 or other suitable processing component). In some examples, the migration instructions may be generated manually, for example, by a developer after reviewing the non-translatable tables generated at 202. The migration instructions for a given source schema table may define a mapping between columns of the source schema table and columns of one or more tables of the target schema 113. In various example embodiments, migration instructions are defined utilizing data definition language commands that are either common to both schemas 107, 113 or return data in a known format recognizable according to the target schema 113. In some examples, migration instructions may use database selects or similar commands. A database select returns requested data from a database such as, for example, a column or columns of a source schema table. During migration, the returned data is written to the appropriate column or columns of one or more corresponding target schema tables. The migration instructions may specify database selects to be executed on the source database 106, and corresponding tables and columns at the target database 113 for receiving the returned data. In some examples, the source schema 107 may define tables with data that is not included in the target schema 113. Migration instructions for tables of this type may indicate that the tables should be skipped and not moved to the target database 112. Upon completion, migration instructions may be stored, for example, in a table definition file that is associated with the appropriate table.

Figure 3:
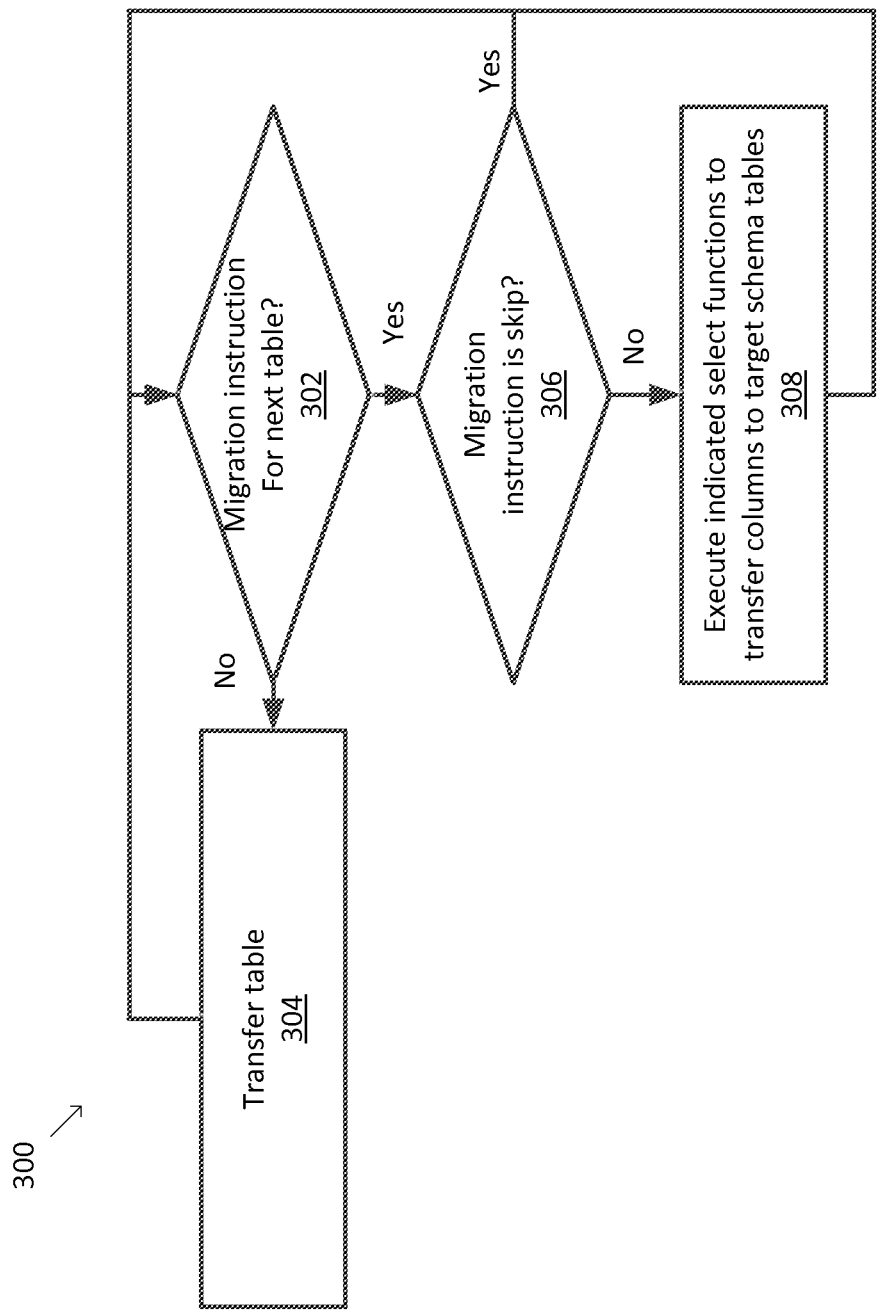
FIG. 3 is a flow chart showing one example of a process flow for executing the database migration.

At 206, the migration server 118 may execute the migration. Executing the migration may involve, for example, examining all of the tables of the source database 106 (e.g., source schema tables). FIG. 3 is a flow chart showing one example of a process flow 206 for executing the database migration. Although the process 300 is described with reference to the flowchart illustrated in FIG. 3, it will be appreciated that many other methods of performing the acts associated with the process 300 may be used. For example, the order of some of the acts may be changed, certain actions may be combined with other actions, and some of the actions described are optional. The migration server 118 may examine each source schema table at the source database 106. At 302, the migration server 118 may determine whether the next source schema table has an associated migration instruction. If the source schema table has no associated migration instruction, the migration server 118 may transfer the table to the target database 112 at 304. The migration server 118 may then execute 302 with respect to the next source schema table at the source database 106. If the source schema table does have an associated migration instruction, then the migration server 118 may determine, at 306, whether the migration instruction associated with the source schema table is a skip instruction. If yes, the migration server 118 may re-execute action 302 with respect to the next source schema table without transferring the considered source schema table. If the migration instruction is not a skip instruction, the migration server 118, at 308, may execute the migration instruction. For example, the migration server 118 may execute one or more indicated select instructions to retrieve columns from the source schema. The retrieved columns may be written to corresponding columns of one or more target schema tables at the target database 112.

Figure 4:
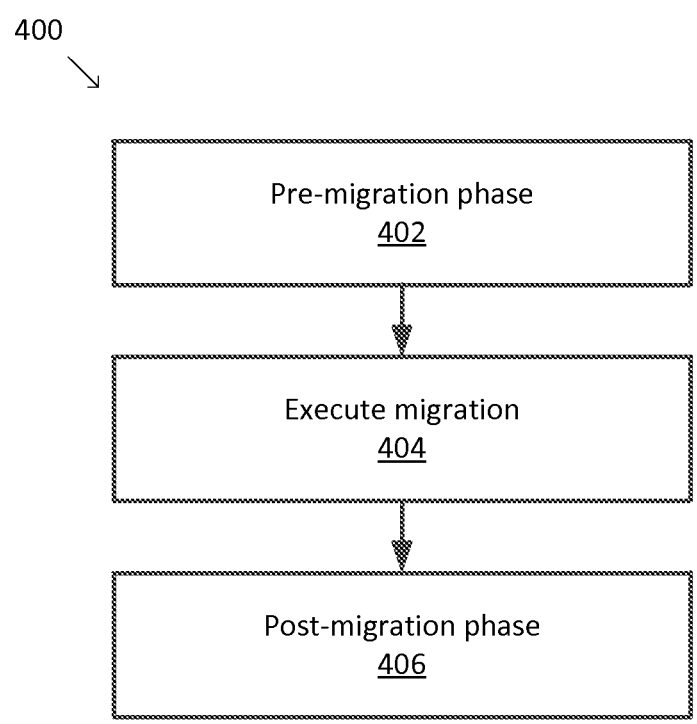
FIG. 4 is a process flow showing one example of a process flow for migrating a database utilizing a pre-migration phase.

In various example embodiments, the migration server 118 may execute a pre-migration phase prior to executing the migration instructions. FIG. 4 is a process flow showing one example of a process flow 400 for migrating a database utilizing a pre-migration phase. Although the process 400 is described with reference to the flowchart illustrated in FIG. 4, it will be appreciated that many other methods of performing the acts associated with the process 400 may be used. For example, the order of some of the acts may be changed, certain actions may be combined with other actions, and some of the actions described are optional. At 402, the migration server 118 may execute a pre-migration phase 402. In some examples, the pre-migration phase may be executed in whole or in part by the source servers 108. During the pre-migration phase, the migration server 118 may make one or more pre-migration modifications to the source database 106. Pre-migration modifications may include, for example, generating one or more pre-migration objects and/or executing one or more pre-migration commands at the source database 106. The pre-migration objects and/or commands may facilitate migration. For example, because the source database 106 and target database 112 are organized according to different schemas 107, 113, not all of the commands of the data definition language and database management system (DBMS) for the source database 106 may be operable for the target database 112. For example, command returns from the DBMS for the source database 106 may not be readable to the target database 112. For this reason, migration instructions may be focused on commands, such as the database select, that return data in a predictable format that is readable according to the target schema 113. This limits the flexibility to optimize the migration based on the properties of the data and/or schemas 107, 113. A pre-migration phase can address this difficulty by conditioning the data prior to migration, for example, using commands that are not available during migration.

At 404, the migration server 118 may execute the migration to the target database 112. Migration may be executed, for example, as described herein with respect to FIGS. 2 and 3. Instead of relying solely on the source schema tables, however, the migration instructions may also utilize pre-migration objects and/or source schema tables that have been modified by pre-migration commands. For example, a database select may be used to transfer data from a pre-migration table to a corresponding table at the target database 112. Also, for example, a database select may be utilized to transfer data from a source schema table utilizing a pre-migration index generated to streamline the select operation. Additionally, for example, a database select may be utilized to transfer data from one or more columns of a source schema table that was added during the pre-migration phase. Optionally, after migration, the migration server 118 or source servers 108 may execute a post-migration phase. In the post-migration phase, pre-migration modifications to the source database 106 may be reversed, for example, returning the source database 106 to its pre-migration state according to the source schema 107. For example, if pre-migration database objects were generated, these may be deleted or moved from the source database 106. Also, for example, if pre-migration commands were executed, those commands may be reversed. In this way, the source database 106 may be returned to its original state under the source schema 107. This may allow source applications 110 to utilize the source database 106 after the migration is complete. Also, for example, returning the source database 106 to its pre-migration state may allow a migration operation to be performed multiple times. In this way, the enterprise executing the migration may execute test migrations without affecting the integrity of the source database 106.

Figure 5:
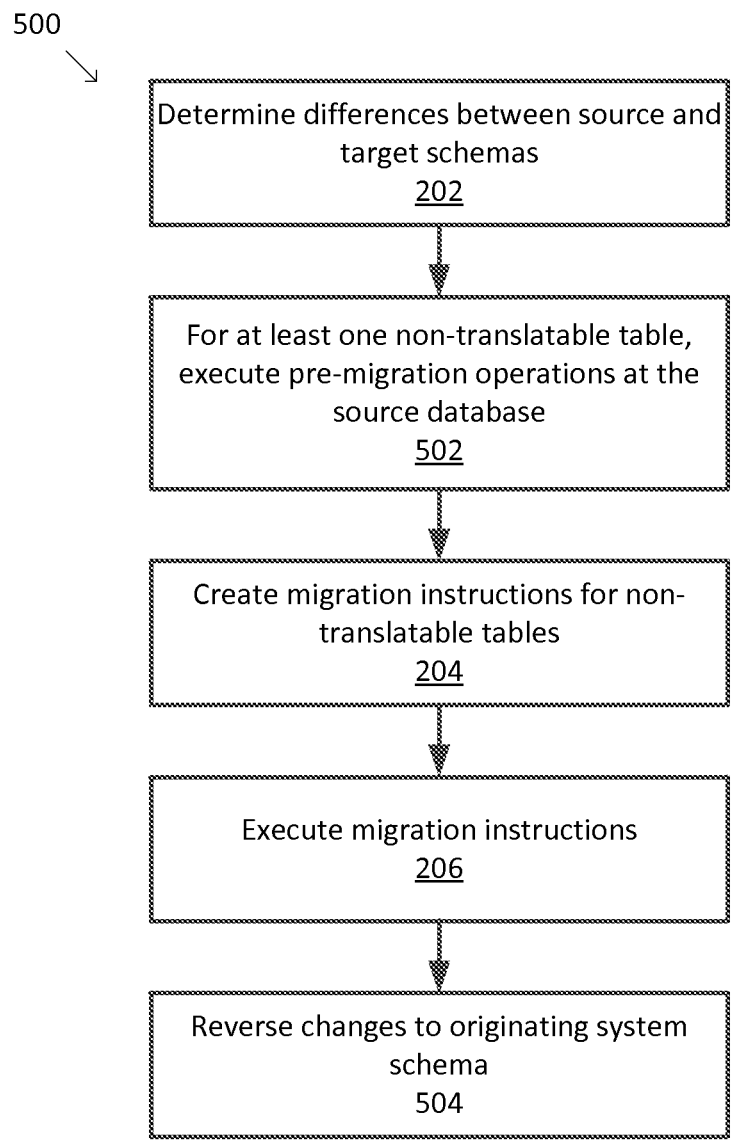
FIG. 5 is a flow chart showing another example of a process flow for migrating data from the source database to the target database utilizing a pre-migration phase.

FIG. 5 is a flow chart showing another example of a process flow 500 for migrating data from the source database 106 to the target database 112 utilizing a pre-migration phase. Although the process 500 is described with reference to the flowchart illustrated in FIG. 5, it will be appreciated that many other methods of performing the acts associated with the process 500 may be used. For example, the order of some of the acts may be changed, certain actions may be combined with other actions, and some of the actions described are optional. The process flow 500 may be similar to the process flow 200 described herein above. The process flow 500, however, comprises a pre-migration phase 502. Optionally, the process flow 500 may also comprise a post-migration phase 504. At 202, the migration server 118 may determine differences between the source and target schemas including, for example, determining non-translatable tables from the source schema 107, as described herein above. During the pre-migration phase 502, the migration server 118 may, for at least one source schema table, generate changes to the source database 106. For example, the changes may involve creating a new database object, such as a table, index, etc., or utilizing a database command of the source database 106 to modify the source database 106. Migration instructions may be generated at 204. The migration instructions may be generated in a manner similar to that described herein above with respect to the process flow 200. The migration instructions generated in the process flow 500, however, may leverage the modifications made to the source database 106 during the pre-migration phase 502. For example, if new database objects are created, the migration instructions may utilize the new database objects to streamline execution. Similarly, if modifications to existing database objects are made, then migration instructions may be generated with respect to the modified database objects. At 206, the migration instructions may be executed, for example, as described above with respect to the process flow 200. The optional post-migration phase 504 may be executed after the migration at 206. The post-migration phase may undo the changes to the source database 106 that were made during the pre-migration phase, as described herein.

Figure 6:
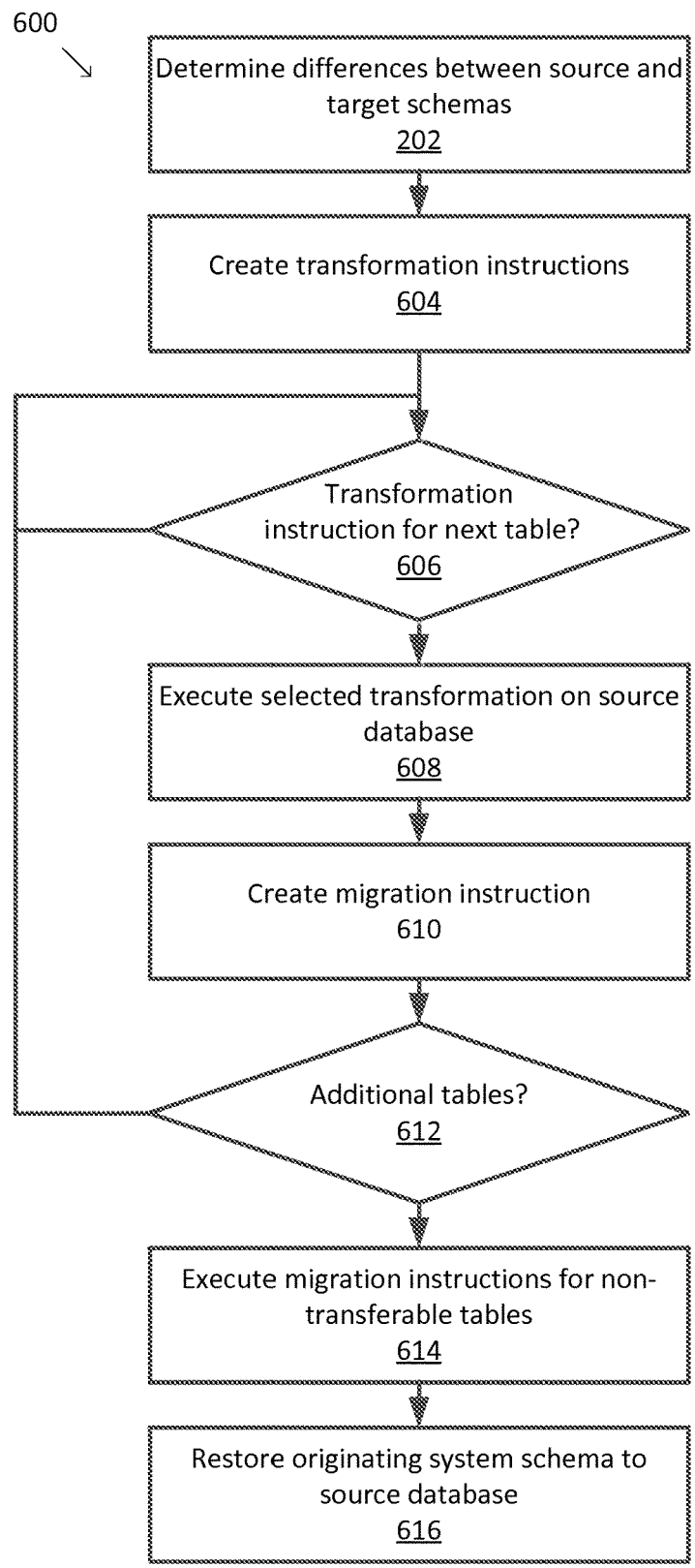
FIG. 6 is a flow chart showing one example of a process flow for migrating data from the source database to the target database utilizing a pre-migration phase and transformation instructions.

According to various example embodiments a migration with a pre-migration phase may be executed utilizing transformation instructions similar to the migration instructions described herein. For example, FIG. 6 is a flow chart showing one example of a process flow 600 for migrating data from the source database 106 to the target database 112 utilizing a pre-migration phase and transformation instructions. Although the process 600 is described with reference to the flowchart illustrated in FIG. 6, it will be appreciated that many other methods of performing the acts associated with the process 600 may be used. For example, the order of some of the acts may be changed, certain actions may be combined with other actions, and some of the actions described are optional. At 202, the migration server 118 may determine differences between the source and target schemas including, for example identifying the tables of the source database 106 that are not translatable to the target schema 113, for example, as described herein. At 604, transformation instructions may be generated for all or a portion of the non-translatable translatable tables. For example, the transformation instructions may specify a pre-migration object to be created (e.g., with data from the non-translatable table) and/or a pre-migration command to be executed (e.g., to perform a modification on the non-translatable table). Transformation instructions may be generated in an automated manner by the migration server 118 and/or may be generated by human developers. In some examples, translation instructions may be stored in table definition files associated with corresponding tables.

When the transformation instructions are generated, the migration server 118 may determine whether there is a transformation instruction for the non-translatable tables at 606. If there is no transformation instruction for a particular table, the migration server 118 may examine the next table at 606. If there is a transformation instruction for the considered table, the migration server 118 may execute the transformation instruction at 608. This may involve creating one or more new pre-migration database objects at the source database 106 and/or executing a pre-migration command at the source database 106. At 610, a migration instruction may be generated for the table. The migration instruction may utilize select or similar commands, as described herein, to transfer the data from the table to the target database 112. The migration instruction, however, may take advantage of one or more newly created pre-migration tables and/or the modifications made to the source database 106 by one or more pre-migration commands. For example, database selects may be targeted at a pre-migration object and/or a new column of a pre-existing source schema table.

If additional non-transferable tables remain at 612, the migration server 118 may return and evaluate 606 with respect to the next table. If not, then the migration server 118 may execute the migration instructions at 614, for example, as described herein with respect to FIG. 3. Optionally, a post-migration phase may be executed at 616. The post-migration phase may return the source database 106 to its original form, as described herein above.

Described below are several examples demonstrating how non-translatable tables may be handled during a migration from a source schema 107 to a target schema 113. In one example, a source schema table called EmployeeDataSS is part of the source schema 107:

| EmployeeDataSS |
| --- |
| EmployeeID |
| Employee First Name |
| Employee Last Name |
| Employee Address |
| Employee Phone Number |

As shown, EmployeeDataSS comprises five columns. An EmployeeID column includes an employee identifier for each employee described by the table. Employee First Name, Employee Last Name, Employee Address and Employee Phone Number columns include corresponding information for each employee described by the table. In the described example, the target schema 113 table corresponding to EmployeeDataSS is EmployeeDataTS, described below:

| EmployeeDataTS |
| --- |
| EmployeeID |
| Employee First Name |
| Employee Last Name |
| Employee Address |

As illustrated, EmployeeDataTS comprises four columns, omitting the Employee Phone Number column that is included in EmployeeDataSS.

In some examples, EmployeeDataSS at the source database 106 may be migrated to the target database 112 utilizing the process described above with respect to FIGS. 2 and 3. At 202 of the process flow 200, for example, EmployeeDataSS may be returned as a non-translatable table, as there is no one-to-one correlation between EmployeeDataSS and EmployeeDataTS. At 204, migration instructions may be generated for EmployeeDataTS. Example migration instructions in pseudo code are indicated below:

```
select EmployeeID
    Employee First Name
    Employee Last Name
    Employee Address
from EmployeeDataSS
```

As illustrated, the instructions are to select the columns EmployeeID, Employee First Name, Employee Last Name, and Employee Address and transfer to the target schema table EmployeeDataTS. The column Employee Phone Number, which does not appear in the target schema table EmployeeDataTS, is not transferred. The migration instructions, upon generation, may be stored in a table definition file associated with EmployeeDataSS, or at another suitable location associated with EmployeeDataSS.

In some examples, there may exist an additional target schema table that includes employee phone numbers according to the target schema 11. In these examples, the migration instructions shown above may include another instruction to select the Employee Phone Number column and write to the additional target schema table. Optionally, a foreign key column referencing the location of the Employee Phone Number column at the additional target schema table may be generated and written as an additional column to EmployeeDataTS.

The migration example above utilizing EmployeeDataSS and EmployeeDataTS may also be executed utilizing a pre-migration phase. For example, during the pre-migration phase, the migration server 118 may create at the source database 106 a pre-migration table, EmployeeDataPM:

| EmployeeDataPM |
| --- |
| EmployeeID |
| Employee First Name |
| Employee Last Name |
| Employee Address |

As shown, EmployeeDataPM may be identical in form to the target schema table EmployeeDataTS. Accordingly, instead of translating EmployeeDataSS column-by-column using database selects, the migration server 118 may skip EmployeeDataSS and simply copy EmployeeDataPM to the target database 112. In the optional post-migration phase, EmployeeDataPM may be deleted from the source database 106.

In another example, two source schema tables, EmployeeDataSS2 and EmployeeNameSS correspond to a single target schema table, EmployeeDatatTS2, as illustrated below:

| EmployeeDataSS1 |
| --- |
| Employee ID |
| EmployeeNameID |
| Employee Address |
| Employee Phone Number |
| EmployeeNameSS |

| EmployeeNameID |
| --- |
| Employee Salutation |
| Employee First Name |
| Employee Middle Name |
| Employee Last Name |
| Employee Suffix |
| EmployeeID |
| EmployeeDataTS2 |

| EmployeeID |
| --- |
| Employee First Name |
| Employee Last Name |
| Employee Address |
| Employee Phone Number |

In some examples, a migration may be executed in the manner described above with respect to FIGS. 2 and 3. EmployeeDataSS1 and EmployeeNameSS may be returned as a non-translatable table at 202, as there is no one-to-one correlation between either of these tables and any one table in the target schema 113. At 204, migration instructions may be generated for EmployeeDataTS. Example migration instructions in pseudo code are indicated below:

Select EmployeeID from EmployeeDataSS2 and write to EmployeeID from EmployeeDataTS2
Select Employee First Name from EmployeeNameSS and write to Employee First Name from EmployeeDataTS2
Select Employee Last Name from EmployeeNameSS and write to Employee Last Name from EmployeeDataTS2
Select Employee Address from EmployeeDataSS2 and write to Employee Phone Number from EmployeeDataTS2
Select Employee Phone Number from EmployeeDataSS2 and write to EmployeeID from EmployeeDataTS2
Skip EmployeeNameID, Employee Salutation, Employee Middle Name, Employee Suffix Alternately, the example tables EmployeeDataSS1 and EmployeeNameSS may be migrated to the target database 112 utilizing a pre-migration phase, for example, as described herein with respect to FIGS. 4-6. For example, during the pre-migration phase, a pre-migration table EmployeeDataPM2 may be created at the source database 106 as illustrated:

| EmployeeDataPM2 |
|---|
| EmployeeID |
| Employee First Name |
| Employee Last Name |
| Employee Address |
| Employee Phone Number |

As illustrated, EmployeeDataPM2 may have the same data as the target schema table EmployeeDataTS2. Accordingly, during migration, EmployeeDataSS1 and EmployeeNameSS may be skipped. The pre-migration table EmployeeDataPM2 may be transferred to the target database 112, where it may operate as the EmployeeDatatTS2 table. In the optional post-migration phase, the table EmployeeDataPM2 may be deleted from the source database 106.

Another example utilizes the RED HAT NETWORK (RHN) SATELLITE product to illustrate a database migration between different product versions. RHN SATELLITE is a system management platform for tracking information technology infrastructure. According to the schema of RHN SATELLITE 5.4, all changelog lines for packages are imported into the RHN SATELLITE database to a table called rhnPackageChangelog and organized as indicated below:

| rhnPackageChangelog | |
|---|---|
| id | Number |
| package_id | number |
| name | varchar |
| text | varchar |
| time | date |
| created | date |
| modified | date |

For example, the following package with the following changelog may be received:
Sat Jan. 18 2013 John Doe<jdoe@redhat.com>0.1-1
first changelog entry According to the schema of RHN SATELLITE 5.4, this package may be recorded at rhnPackageChangelog as the following row:
rhnPackageChangelog.name: John Doe<jdoe@redhat.com>0.1-1
rhnPackageChangelog.text: -first changelog entry
rhnPackageChangelog.time: 2013-01-18

If a second version of the package is built with a new package_id, the changelog entry may be:
Sun Jan. 19 2013 John Doe<jdoe@redhat.com>0.2-1
second changelog entry
Sat Jan. 18 2013 John Doe<jdoe@redhat.com>0.1-1
first changelog entry According to the schema of RHN SATELLITE 5.4, this package may be recorded at rhnPackageChangelog as the following two rows:
rhnPackageChangelog.name: John Doe<jdoe@redhat.com>0.1-1
rhnPackageChangelog.text: -first changelog entry
rhnPackageChangelog.time: 2013-01-18
rhnPackageChangelog.name: John Doe<jdoe@redhat.com>0.2-1
rhnPackageChangelog.text: -second changelog entry
rhnPackageChangelog.time: 2013-01-19

Accordingly, every import of a new package version may duplicate changelog entries from the previous versions.

This duplication of data results in inefficient data storage. Accordingly, some subsequent versions of the RED HAT SATELLITE product, such as RED HAT SATELLITE 5.6, utilize schemas in which the table rhnPackageChangelog is replaced by two tables, rhnPackageChangelogData and rhnPackageChangelogRec. The tables rhnPackageChangelogData and rhnPackageChangelogRec may be constituted as indicated below:

| rhnPackageChangelogData | |
|---|---|
| id | number |
| name | varchar |
| text | varchar |
| time | date |
| created | date |

| rhnPackageChangelogRec | |
|---|---|
| Id | number |
| package_id | number |
| changelog_data_id | number |
| created | date |
| modified | date |

Various methods may be used to migrate a database from a schema utilizing rhnPackageChangelog (a source schema 107) to a schema utilizing rhnPackageChangelogData and rhnPackageChangelogRec (a target schema 113). In some examples, the migration may be executed as described above with respect to FIGS. 2 and 3. For example, migration instructions for rhnPackageChangelogData may include instructions for creating both target schema tables. The target schema table rhnPackageChangelog may be created by extracting the unique tuples from rhnPackageChangelog and inserting them into rhnPackageChangelogData at the target database 112. Example migration instructions for doing so are indicated below:

| rhnpackagechangelogdata: |
|---|
| missing table<br>    select min(id), name, text, time, min(created) created<br>    from rhnpackagechangelog<br>    group by name, text, time |

In the target schema 113, the table rhnPackageChangelogRec may be used to link the tuples from rhnPackageChangelogData, such as name, text, time, etc. to received packages (e.g., indicated by package_id). Example migration instructions for generating rhnPackageChangelogRec are provided below:

```
rhnpackagechangelogrec:
missing table
    select id, package_id,
        min(id) over (partition by name, text, time) changelog_data_id,
        created, modified
    from rhnpackagechangelog
```

The example instructions given above for creating rhnPackageChangelogData and rhnPackageChangelogRec include two database selects that must be executed over a source schema table with grouping and partitioning, i.e., rhnPackageChangelog. The migration described above may work well when rhnPackageChangelog is small. In practice, however, rhnPackageChangelog can often be quite large. For example, in some deployments, it can be several gigabytes or more. When rhnPackageChangelog is large, the database selects described above are liable to take a very long time to execute and, in some cases, may hit pre-configured database space boundaries and, therefore, fail altogether. To alleviate these problems, a pre-migration phase may be used, for example, as described herein with respect to FIGS. 4-6. Because additional data definition language commands are available in the pre-migration phase, moving some portion of the transformations indicated above into the pre-migration phase may allow the use of more sophisticated optimization techniques for increased efficiency.

In some examples, a pre-migration phase for rhnPackageChangelog may involve creating two new pre-migration tables and related indices. For example, a pre-migration table rhnPackageChangeLogData, a pre-migration table rhnPackageChangeLogRec and a related pre-migration index may be created as indicated by the example transformation instructions below:

```
id,package_id,name,text,time,created,modified
    CREATE TABLE rhnPackageChangeLogData (
        id      NUMBER NOT NULL CONSTRAINT rhn_pkg_cld_id_pk PRIMARY KEY,
        name    VARCHAR2(128) NOT NULL,
        text    VARCHAR2(3000) NOT NULL,
        time    DATE NOT NULL,
        createdDATE DEFAULT (sysdate) NOT NULL)
    CREATE INDEX rhn_pkg_cld_nt_idx ON rhnPackageChangeLogData (name, time)
    CREATE TABLE rhnPackageChangeLogRec (
        id          NUMBER NOT NULL CONSTRAINT rhn_pkg_clr_id_pk PRIMARY KEY,
        package_id  NUMBER NOT NULL CONSTRAINT rhn_pkg_clr_pid_fk
                        REFERENCES rhnPackage (id) ON DELETE CASCADE,
        changelog_data_id NUMBER NOT NULL CONSTRAINT rhn_pkg_clr_cld_fk
                        REFERENCES rhnPackageChangeLogData (id),
        created     DATE DEFAULT (sysdate) NOT NULL,
        modified    DATE DEFAULT (sysdate) NOT NULL )
```

Next, the pre-migration table rhnPackageChangelogData may be populated as indicated below:

```
insert /*+append*/ into rhnPackageChangeLogData (id, name, text, time, created)
    select min(id), name, text, time, min(created)
    from rhnPackageChangelog
    group by name, text, time
```

The pre-migration table rhnPackageChangelogData may be paired with rhnPackageChangelog. Resulting pairs may be placed into the pre-migration table rhnPackageChangelogRec. For example, the instructions below take an arbitrary number of records from rhnPackageChangelog table and insert the respective changelog_data_id, package_id pairs into the pre-migration table rhnPackageChangelogRec table.

```
declare
    max_id integer;
    i integer;
begin
    select max(id), min(id) into max_id, i from
        rhnPackageChangeLog;
    while i <= max_id loop
        insert /*+append*/ into rhnPackageChangelogRec
            (id, package_id, changelog_data_id, created,
            modified)
        select rhnPackageChangeLog.id,
                rhnPackageChangeLog.package_id,
                rhnPackageChangeLogData.id,
                rhnPackageChangeLog.created,
                rhnPackageChangeLog.modified
        from rhnPackageChangeLog,
                rhnPackageChangeLogData
        where rhnPackageChangeLog.name =
                    rhnPackageChangeLogData.name
            and rhnPackageChangeLog.text =
                    rhnPackageChangeLogData.text
            and rhnPackageChangeLog.time =
                    rhnPackageChangeLogData.time
            and rhnPackageChangeLog.id >= i
            and rhnPackageChangeLog.id < i +10000;
        commit;
        i := i + 10000;
    end loop;
end;
```

As indicated, a commit instruction may be executed after every insert. In this way, size limitations, especially of the source database 106 may be mitigated during migration. As described herein and illustrated above, some examples allow the full range of data definition language commands to be used during the pre-migration phase including, for example, create table, create index, etc. In the example above, this allowed the use of the insert/*+append*/command rather than a plain insert. This command is common to ORACLE DMBS's and provides a more effective way of inserting or appending data to a table. Also, in the provided example, PL/SQL language is used to create an anonymous block of database code, which inserts the data to the pre-migration table rhnPackageChangelogRec table. Using PL/SQL may allow the data insertion to be split into smaller chunks, of 10,000 rows in this example, and optionally committed after each insertion.

At the conclusion of the pre-migration phase, the source database 106 includes the source schema table rhnPackageChangelog and also the pre-migration tables rhnPackageChangelogData and rhnPackageChangelog Rec. During migration, the migration server 118 may skip rhnPackageChangelog and migrate the pre-migration tables rhnPackageChangelogData and rhnPackageChangelogRec to the target database 112. Example migration instructions for the source schema table rhnPackageChangelog are provided below:

rhnpackagechangelog
skip

The migration instructions above may be included in a definition file associated with rhnpackagechangelog. In some examples, definition files for rhnPackageChangelogData and rhnPackageChangelogRec may be omitted. In this way, the migration server 118 may migrate these tables to the target database 112 without modification, for example, as illustrated with respect to FIG. 3.

In yet another example, a database migration may utilize a pre-migration phase to generate a pre-migration table index for use during migration to speed up the migration process. In the example, the source schema 107 includes source schema tables A and B:

| A | |
|---|---|
| id | number |
| data_a | string |
| B | |
| a_id | number references A.id |
| data_b | string |

In the target schema 113, all rows from table B that point to the rows of table A containing the string 'delete' in the data_a column are dropped. Migration instructions for table B according to the method described above with respect to FIGS. 2 and 3 are provided below:

```
B
  a_id, data_b
    select B.a_id, B.data_b from A, B where A.id = B.a_id and
    A.data_a < > 'delete';
```

Because the source schema 107 does not have any indices defined for A.data_a, the A.data_a< >'delete' condition in the select statement may require a full table scan. Especially for larger tables, then, the migration may take a considerable length of time.

This problem may be mitigated by using a pre-migration phase, as described above with respect to FIGS. 4-6. During the pre-migration phase, the migration server 118 may generate a pre-migration index to allow for more effective selection of data. An example transformation instruction for generating a pre-migration index A_data_a_temp_idx is shown below:

```
A
  id, data_a
    create index A_data_a_temp_idx on A (data_a)
```

After the pre-migration phase, the pre-migration index A_data_a_temp_idx may then be utilized during migration to streamline execution of the database selects. In the optional post-migration phase, the pre-migration index may be deleted, for example, according to the instructions below:

```
A
  id, data_a
    drop indexA_data_a_temp_idx;
```

Migration instructions for the table B, for example, may be similar or identical to those provided herein above.

In a further example, a pre-migration table may be utilized to enhance selection of data in the migration phase. In the example, the source schema 107 may define tables A1, B1, C1, and D1 as follows:

| A1 | |
|---|---|
| id | number |
| data_a | string |
| B1 | |
| id | Number |
| a_id | number references A.id |
| data_b | string |
| C1 | |
| id | number |
| a_id | number references B.id |
| data_c | string |
| D1 | |
| id | number |
| c_id | number references C.id |
| data_d | string |

In the example, assume that the data column in table A1 contains duplicates. In the example target schema 113, the duplicate are removed. Because the rows in table B points to rows in table A, rows in table C point to rows in table B, and rows in table D point to rows in table C, simply removing the duplicates from table A does not maintain referential integrity. To maintain referential integrity, dead links must also be removed from tables B, C, and D. According to the migration methods described above with respect to FIGS. 2 and 3, dead links are removed by simply not selecting dead link records. Example migration instructions according to the methods described above with respect to FIGS. 2 and 3 are given below for tables A, B, C and D. For example, with respect to Table A, unique values from the data_a may be selected, along with the lowest or minimal id:

A:

```
id, a_data
  select min(id), data from A group by data_a;
```

With respect to table B, a select operation is used to select rows from table B that would point, via column a_id, to a valid row in table A. Similar instructions may be used for tables C and D:

```
B:
id, a_id, b_data
  select id, a_id, b_data from B where a_id in (
    select min(id) from A group by data_a
  );
```

```
C:
id, b_id, c_data
    select id, b_id, c_data from C where b_id in (
        select id from B where a_id in (
            select min(id) from A group by data_a
        )
    );
D:
id, c_id, d_data
    select id, c_id, d_data from D where c_id in (
        select id from C where b_id in (
            select id from B where a_id in (
                select min(id) from A group by data_a
            )
        )
    );
```

Many data control languages include a cascaded delete command, such as ON DELETE CASCADE that allows linked deletes to be processed in an efficient manner. In the migration method described above with respect to FIGS. 2 and 3, however, cascaded delete mechanisms may not be available. To overcome this limitation and to limit the number of calls to the min( ) command, or similar mechanisms, a pre-migration phase may be executed, for example, as described with respect to FIGS. 4-6. In the pre-migration phase, pre-migration tables A_tmp, B_tmp, C_tmp may be created. A_tmp may be populated with A.id values that will end up in the target schema table A after deduplication. B_tmp may be populated with B.id values that will end up in target schema table B after deduplication. C_tmp may be populated with C.id values that will end up in target schema table C after deduplication. The pre-migration tables A_tmp, B_tmp, and C_tmp, then, may be used during migration to fill tables A, B and C in the target database.

In the pre-migration phase, A_tmp, B_tmp, and C_tmp may be generated according to the example transformation instructions below:

```
A:
id, data_a
    create table A_tmp (id number);
    insert into A_tmp (id) (
        select min (id) from A group by data_a
    );
    create table B_tmp (id number);
    insert into B_tmp (id number) (
        select id from B where a_id in (select id from A_tmp)
    );
    create table C_tmp (id number);
    insert into C_tmp (id) (
        select id from C where b_id in (select id from B_tmp)
    );
```

After the pre-migration phase, the values used in tables A_tmp, B_tmp, and C_tmp may be utilized to recreate the target schema 113 versions of the tables A, B, C, and D. Example migration instructions utilizing the pre-migration tables A_tmp, B_tmp, C_tmp are provided below:

```
A:
id, data_a
    select id, data_a from A where id in (select id from A_tmp);
B:
id, a_id, data_b
    select id, a_id, data_b from B where a_id in (select id from A_tmp);
C:
id, b_id, data_c
    select id, b_id, data_c from C where b_id in (select id from B_tmp);
D:
id, c_id, data_d
    select id, c_id, data_d from D where c_id in (select id from C_tmp);
```

In an optional post-migration phase, the three temporary pre-migration tables A_tmp, B_tmp, and C_tmp may be dropped. Example post-migration instructions are provided below:

```
A:
id, data_a
    drop table A_tmp;
B:
id, data_b
    drop table B_tmp;
C:
id, data_c
    drop table C_tmp;
```

Reference in the specification to, "embodiments," "various example embodiments," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as, for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as, for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It can be appreciated that, in some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. It can be appreciated that such examples are intended primarily for purposes of illustration. No particular aspect or aspects of the example method, product, computer-readable media, and/or system examples described herein are intended to limit the scope of the present disclosure.

It will be appreciated that the various components of the environment 100 may be and/or be executed by any suitable type of computing device including, for example, desktop computers, laptop computers, mobile phones, palm top computers, personal digital assistants (PDA's), etc. As used herein, a "computer," "computer system," "computer device," or "computing device," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of a method. It should be noted that the process steps and instructions of the present disclosure can be embodied in software, firmware or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. It will be appreciated that a variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

We claim:

1. A computer-implemented system for migrating a database from a source database having a source schema to a target database having a target schema, wherein the source schema defines a plurality of source schema tables, the system comprising:
   at least one processor and operatively associated memory, wherein the at least one processor is programmed to:
      for each of the plurality of source schema tables that is associated with a corresponding migration instruction, execute the migration instruction, wherein:

executing the migration instruction causes the at least one processor to create at the source database a pre-migration object, which includes a temporary database table;

the source database is configured to execute a plurality of data control language (DCL) commands, of which a subset of the DCL commands are inoperable for the target database:

for the pre-migration object, executing the migration instruction comprises selecting at least one column of a first source schema table and at least one column a second source schema table and writing the at least one column of the first source schema table and the at least one column a second source schema table to the pre-migration object;

a migration failure is prevented by populating the pre-migration object using a DCL command of the subset of DCL commands;

one of deleting and moving the pre-migration object returns the source schema to a pre-migration state;

for the second source schema table, executing the migration instruction comprises skipping the second source schema table;

transferring, by the at least one processor, the pre-migration object from the source database to the target database, wherein the source database resides on a different host from the target database and the source schema is different from the target schema; and returning the source schema to a pre-migration state, wherein returning the source schema to the pre-migration state includes deleting the pre-migration object.

2. The system of claim 1, wherein the at least one column of the first source schema table comprises less than all of the columns of the first source schema table.

3. The system of claim 1, wherein executing the migration instruction further comprises, for a third source schema table, selecting at least one column of the third source schema table and writing the at least one column of the third source schema table to at least one of a first target schema table and the pre-migration object.

4. The system of claim 1, wherein the at least one processor is further programmed to modify the source schema, wherein the modifying comprises modifying at least one table at the source database.

5. The system of claim 1, wherein a different pre-migration object is selected from the group consisting of a pre-migration table and a pre-migration index.

6. The system of claim 1, wherein the at least one processor is further programmed to, for each of the plurality of source schema tables, determine whether the source schema table is associated with a respective migration instruction.

7. The system of claim 1, wherein the at least one processor is further programmed to, for each of the plurality of source schema tables that is not associated with a corresponding migration instruction, transfer the source schema table to the target database.

8. The system of claim 1, wherein the selecting at least one column of the first source schema table comprises executing a select instruction.

9. A computer-implemented system for migrating a database from a source database having a source schema to a target database having a target schema, wherein the source schema defines a plurality of source schema tables, the system comprising:

at least one processor and operatively associated memory, wherein the at least one processor is programmed to:

execute a pre-migration phase at the source database, wherein the plurality of source schema tables are not permanently modified by executing the pre-migration phase, the source database is configured to execute a plurality of data control language (DCL) commands, of which a subset of the DCL commands are inoperable for the target database, and executing the pre-migration phase comprises:

generating a pre-migration table at the source database, wherein the pre-migration table is a temporary database table; and populating the pre-migration table with at least a portion of the columns from a first source schema table of the plurality of source schema tables, wherein a migration failure is prevented by populating the pre-migration object using a DCL command of the subset of DCL commands;

execute a migration phase, wherein executing the migration phase comprises selecting at least one column from the pre-migration table and writing the at least one column to the target database, wherein the source database resides on a different host from the target database and the source schema is a different schema from the target schema; and execute a post-migration phase, wherein executing the post-migration phase comprises deleting the at least one pre-migration table from the source database thereby returning the source schema to a pre-migration state.

10. A computer-implemented system for migrating a database from a source database having a source schema to a target database having a target schema, wherein the source schema defines a plurality of source schema tables, the system comprising:

at least one processor and operatively associated memory, wherein the at least one processor is programmed to:

execute a pre-migration phase at the source database, wherein the plurality of source schema tables are not permanently modified by executing the pre-migration phase, the source database is configured to execute a plurality of data control language (DCL) commands, of which a subset of the DCL commands are inoperable for the target database, and executing the pre-migration phase comprises:

generating a pre-migration object at the source database, wherein the pre-migration object includes a temporary database table; and populating a pre-migration table with at least a portion of the columns from a first source schema table of the plurality of source schema tables, wherein a migration failure is prevented by populating the pre-migration object using a DCL command of the subset of DCL commands;

execute a migration phase, wherein executing the migration phase includes selecting at least one column from the pre-migration table and writing the at least one column to the target database, wherein the source database resides on a different host from the target database, the source schema is a different schema from the target schema; and return the source schema to a pre-migration state, wherein returning the source schema to the pre-migration state includes deleting the pre-migration object.

11. The system of claim 10, wherein the at least one processor is further programmed to execute a post-migration phase, wherein executing the post-migration phase comprises reversing at least one change made to the source database during the pre-migration phase.

12. The system of claim 11, wherein executing the post-migration phase comprises:
reversing a pre-migration command.

13. The system of claim 10, wherein executing the migration phase comprises skipping the first source schema table and transferring the pre-migration table to the target database.

14. The system of claim 10, wherein executing the migration phase comprises:
selecting at least one column from the first source schema table;
writing the at least one column from the first source schema table to a first target schema table at the target database;
selecting at least one column from the pre-migration table; and
writing the at least one column from the pre-migration table to the first target schema table.

15. The system of claim 10, wherein the pre-migration table comprises unique rows from the first source schema table.

16. The system of claim 10, wherein executing the pre-migration phase comprises generating a pre-migration index describing data stored in a first source schema table, and wherein the executing the migration phase comprises selecting at least one column from the first source schema table considering the pre-migration index.

17. The system of claim 10, wherein executing the pre-migration phase comprises executing a plurality of transformation commands, wherein each of the plurality of transformation commands is associated with at least one of the plurality of source schema tables, and wherein executing the migration phase comprises executing a plurality of migration commands, wherein each of the migration commands is associated with a table selected from the group consisting of a source schema table and the pre-migration table generated during the pre-migration phase.

18. The system of claim 9, wherein the pre-migration table is populated from multiple source schema tables.

19. The system of claim 1, wherein the first pre-migration object is deleted by dropping the temporary database table.

20. The system of claim 1, wherein the subset of DCL commands includes a command associated with a cascaded delete operation.

* * * * *